United States Patent [19]

Orzel

[11] 4,272,659
[45] Jun. 9, 1981

[54] HYDRAULIC BRAKE WARNING SWITCH

[75] Inventor: Edward S. Orzel, Parma, Ohio

[73] Assignee: Dana Corporation, Toledo, Ohio

[21] Appl. No.: 106,095

[22] Filed: Dec. 21, 1979

[51] Int. Cl.³ .............................................. H01H 35/38
[52] U.S. Cl. ................................ 200/82 D; 303/6 C;
340/52 C
[58] Field of Search ............. 340/52 C, 626; 303/6 C;
188/151 A, 349; 200/302, 82 R, 82 C, 82 D, 153 LA

[56]  References Cited
U.S. PATENT DOCUMENTS

| 3,672,728 | 6/1972 | Keady | 200/82 D |
| 3,832,007 | 8/1974 | Thrush | 303/6 C |

Primary Examiner—Gerald P. Tolin
Attorney, Agent, or Firm—Pearne, Gordon, Sessions, McCoy & Granger

[57] ABSTRACT

A differential pressure sensing switch for a motor vehicle has a piston axially slidable in a housing and exposed at each end to the pressure in separate brake circuits. At one end, the piston has a smaller diameter exposed to fluid pressure than at the other end and a sleeve and seal are slidable on said smaller diameter to have a combined diameter greater than that of the other end. A spring biases the sleeve toward the one end so that on cycling, the piston moves first in one direction and then in the other direction to provide positive movement between each seal and its adjacent sealing surface.

7 Claims, 3 Drawing Figures 4,272,659

HYDRAULIC BRAKE WARNING SWITCH

BACKGROUND OF THE INVENTION

Hydraulic brake systems for motor vehicles such as automobiles and light trucks are currently dual systems using two separate hydraulic circuits, usually for the front brakes and the rear brakes independently. Such systems utilize either a tandem master cylinder or dual master cylinders operated by a single pedal, and for this reason the pressure in both systems will be substantially identical under normal conditions, at least as far as these pressures can be measured at the master cylinder. With the two separate hydraulic brake circuits, which are hydraulically independent of each other and not interconnected, a hydraulic failure by leakage in one of the systems or circuits will not affect the other circuit, so that after a failure of either the front or the rear brakes, the other set will remain operative for stopping the vehicle, at least on an emergency basis.

With modern vehicles using power assists for the hydraulic brake circuits, a problem is presented that the brakes may be so powerful that a failure of one of the systems, so that only two wheels are braking, would not be noticed by the driver as the result of any substantially increased pedal effort, and therefore the vehicle might continue to be driven without operator knowledge of the failure, which would be an unsafe condition since there would therefore be no reserve braking for necessary minimum emergency stopping distances.

To overcome this problem, motor vehicles using these dual systems have incorporated a brake warning switch arrangement which will activate an indicator light on the dashboard of the vehicle in the event of a failure or inability to build up the required hydraulic pressure in one of the circuits. This has been accomplished by means of a pressure differential sensing switch, which may be integral with or separate from the master cylinder and consists of a body member having an axial bore in which a piston or spool member is mounted for axial sliding movement. Each end of the bore provides a trapped area which is is connected to one of the hydraulic brake circuits and, generally, the bores have equal area so that the spool or piston will be held in an intermediate or central position as long as the pressures at the ends are substantially equal. Generally, the spool may have a cam or ramp portion intermediate the ends which is utilized to actuate a switch mounted on the unit body so that whenever the pressure differential between the two hydraulic brake circuits exceeds a predetermined minimum, the spool will move in the direction of the lower pressure circuit to mechanically actuate an electrical switch to light a signal light on the dashboard of the vehicle. In order to ensure against operation unless the pressure differential exceed a predetermined minimum, there may be centering type biasing springs mounted in the bore to hold the piston in the middle position or, alternatively, various arrangements have been developed using differential areas and a floating sleeve so that a single spring can provide a centering action in both directions of movement of the spool.

However, it has been recognized that with such devices, problems may arise in view of the fact that the warning system must be operative at all times when the vehicle is in use, but may not be called upon to operate until many years after the vehicle has first been placed in use. It has been recognized that when the valve spool is perfectly balanced and does not have any bias to move, certain seals, such as O-rings and the like, may deteriorate either with age or because of contamination with the fluid, as well as because the sealing material takes a cold set under the environmental conditions which the unit experiences during operation of the motor vehicle. In such cases, if the seals fail, there may be a leakage from the system under normal operation which may even involve both hydraulic circuits or, alternatively, the seals could cause the unit to freeze so that the spool could not move even above the predetermined pressure levels in the event of an actual brake failure so that the driver would receive no warning and might continue to drive the vehicle with one defective brake system.

SUMMARY OF THE INVENTION

The present invention provides a brake warning switch in which the piston or spool is reciprocated axially in a back-and-fourth movement during each brake application cycle of a pressure increase up to a maximum and decrease back to either zero or whatever residual pressure remains in the system. This positive reciprocating movement of the spool causes the sealing members isolating the two hydraulic circuits from each other and from vent to the atmosphere to positively move along each of the surfaces against which sealing contact is made to ensure that these surfaces remain clean and to eliminate any cold set, adhesion, or other problems that can arise over a long period of time from stationary contact between an elastomeric seal and a metallic sealing surface.

According to the preferred form of the embodiment of this invention, the housing has an axial bore having two different diameters on either side of a central transverse opening which mounts a plunger-type electric switch. A single spool is mounted within the bore and has a piston carrying an O-ring seal in sliding sealing engagement with the smaller of the two bores. Intermediate its ends, the spool has a reduced diameter portion adjacent the switch plunger and a pair of cam ramps on each side, so that movement of the spool in either direction from the central position will move the switch plunger outward to close the switch contacts.

The other portion of the spool in the larger diameter body bore carries a cylindrical portion of lesser diameter than the other end upon which is slidably mounted an annular sleeve having an outer diameter equal to that of the larger bore. An O-ring seal mounted beside the sleeve on the side away from the switch makes sealing contact with both the reduced diameter of the spool and the larger diameter body bore so that the O-ring seal has substantially the same annular cross sectional area as the sleeve. Movement of the sleeve toward the center, or where the switch is located, is limited by a stop shoulder on the spool and a collapsible helical compression spring surrounds this portion of the spool to abut at the one end against a shoulder in the body bore and at the other end against the sleeve.

The position of the shoulder on the spool, the free and collapsed lengths of the helical spring, and the central portion on the valve spool are selected so that when both ends of the bore, which are sealed and connected to the two separate respective hydraulic circuits of the brake system, are at substantially zero pressure, the switch plunger will be riding near the middle of the reduced diameter portion of the spool, while the helical spring will hold the sleeve a spaced distance from the spool shoulder. When both sides of the device are initially pressurized at the same pressure, since the portion of the spool in the smaller diameter body bore is greater than the diameter of the spool in the enlarged bore, the entire spool will be urged toward the enlarged bore. Normal force on the switch plunger resists this motion of the spool, and hence the sleeve and adjacent O-ring seal on the spool move against the spring until the sleeve engages the stop shoulder on the spool. This movement causes that O-ring to move with respect to both the sealing surface on the spool and the sealing surface of the bore. As the pressures continue to build up, the sleeve and spool will slide together as a unit toward the other bore until the helical spring has collapsed, at which point further movement of the spool will cease. The space between the cam ramps on the spool is so selected as to accommodate this movement without allowing the ramps to engage the plunger to operate the switch.

However, a failure in pressure on either of the two sides during a brake application will create a great enough pressure differential to cause the spool to slide in the requisite direction to actuate the switch plunger and indicate a failure. Furthermore, the movement of the spool can be made sufficiently small that it is still possible to allow the spool to carry an actuating member for another brake unit, such as a pressure proportioning valve, in the manner well known in the prior art.

BRIEF DESCRIPTION OF THE DRAWINGS

These and other aspects, principles, and advantages of the present invention are incorporated in the preferred embodiment of the invention shown in the accompanying drawings, wherein.

DESCRIPTION OF THE PREFERRED EMBODIMENT

Figure 1:
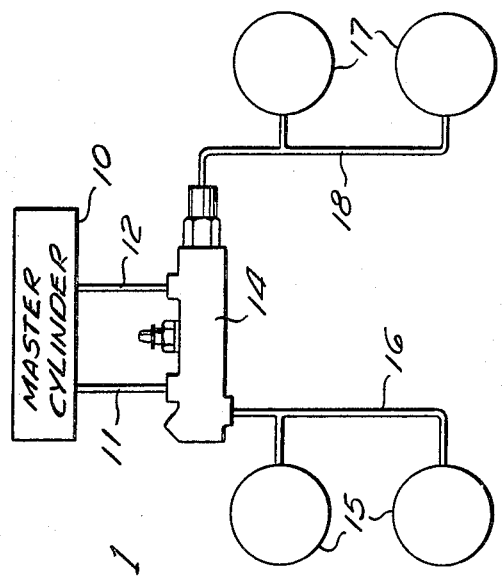
FIG. 1 is a schematic circuit diagram of a motor vehicle hydraulic brake system incorporating the brake warning switch of the present invention.
Figure 3:
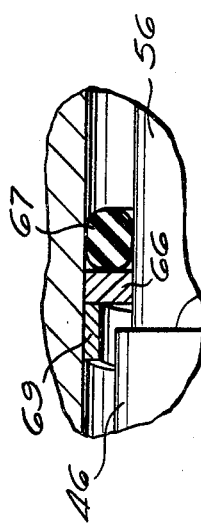
FIG. 3 is an enlarged, fragmentary, cross sectional view of the sleeve and biasing spring shown in FIG. 2.

Referring now to the drawings in greater detail, FIG. 1 shows a schematic circuit diagram for a motor vehicle having two separate hydraulic circuits to actuate the wheel brakes. A master cylinder 10, which may be preferably of the tandem type, has a front brake circuit supply line 11 and a rear brake circuit supply line 12 which are connected to the warning switch unit 14 from which the front wheel brakes 15 are supplied through line 16 while the rear wheel brakes 17 are supplied through a second line 18. It will be understood that the lines 11 and 16 are connected together as are the lines 12 and 18, and that the pressures in the supply lines 11 and 12 will be substantially the same at all times, including when the brakes are applied to provide a maximum stopping effect.

Figure 2:
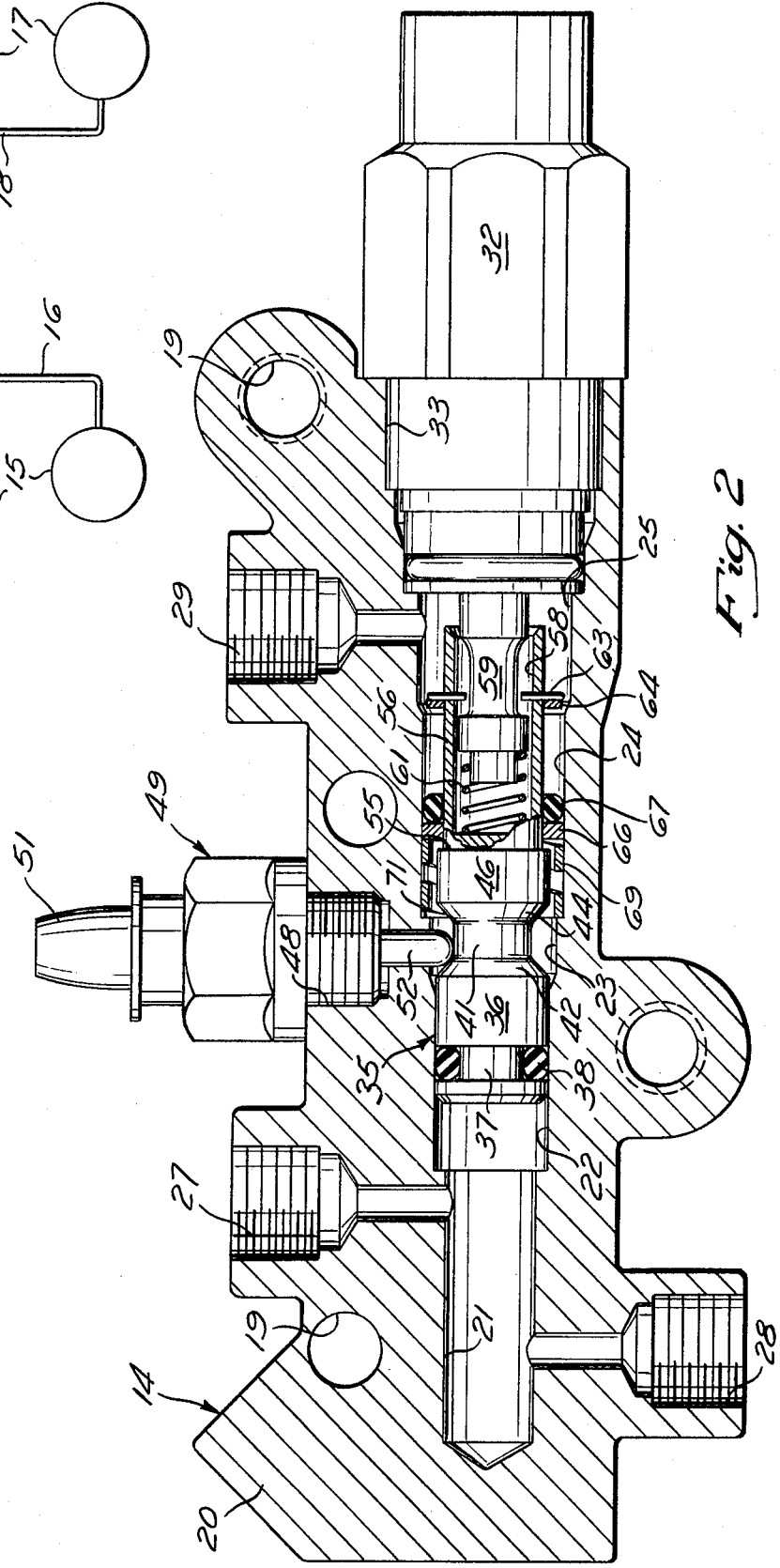
FIG. 2 is an enlarged, side elevational, cross sectional view of the brake warning switch shown in FIG. 1.

As shown in FIG. 2, the brake warning switch unit 14 includes a housing 20 which may be machined from an extruded brass blank or an iron casting and is provided with suitable holes as shown at 19 for mounting on the chassis of a motor vehicle. Extending lengthwise through the housing 20 is a series of coaxial, connected, stepped bores beginning with the smallest diameter bore 21 at the one end of the housing, which at its right end joins a larger bore 22. Bore 22 in turn joins a still larger bore 23 and successively larger bores 24 and 25, whose functions will be described in greater detail hereinafter.

Suitable ports are provided to allow fluid connection to the bores so that port 27, which joins bore 21, allows connection for the supply line 11 to the front brakes, and likewise a port 28, also opening in bore 21, permits connection for the line 16 to the front brakes 15. The supply line 12 for the rear brakes is connected to a port 29 opening into the enlarged bore 25 while the line 18 to the rear brakes 17 is connected to a proportioning valve unit mounted in another counterbore 33. This proportioning valve unit 32 may be constructed and arranged in accordance with the disclosure in U.S. Pat. No. 3,832,007, granted Aug. 27, 1974, and will not be described in detail, since it forms no part of the present invention.

Within the bores 21-25 is mounted a unitary piston or spool 35 having a left head portion 36 slidably mounted within the bore 22. The head 36 carries an annular groove 37 receiving an O-ring seal 38 arranged to make sealing contact with the bore 22 as the piston or spool 35 moves axially within the spool bores. To the right of the left head portion 36 is a reduced cylindrical portion 41 which is connected to the left head portion by a left ramp 42 and by a right ramp 44 to a right cylindrical head portion 46, which is of the same diameter at the left head portion 36. It will be noted that the reduced cylindrical portion 41 has a predetermined axial extent so that the ramps 42 and 44 are spaced apart a predetermined distance. A threaded port 48 opens into the bore 23 in approximate alignment with reduced cylindrical portion 41 and in the port 48 is mounted an electrical switch 49 having an external terminal 51 and a plunger 52 having a rounded end adapted to normally rest in light sliding contact with the reduced cylindrical portion 41. It will be understood that if the spool 35 is moved a sufficient distance to the right, the plunger 52 will ride up the left ramp 42 to actuate the switch and produce a signal to the operator that he has a failure of one of the brake systems. Likewise, movement of the spool 35 toward the left will cause the plunger 52 to ride up the right ramp 44 to close the switch and produce a similar effect.

At the right end of the right head portion 46 the spool or piston has a radially extending shoulder 55 and a reduced diameter end portion 56 which extends toward the proportioning valve 32. The end portion 56 may be provided with an axial bore 58 in which is mounted a poppet 59 and biasing spring 61 to function with proportioning valve 32 in the manner described in patent 3,832,007. To retain the poppet 59 and biasing spring 61 in place during assembly of the unit, or upon removal for service purposes of the proportioning valve 32, the end portion 56 is provided with a retainer clip 63 to the left of which is mounted a washer 64.

Also mounted on the end portion 56 is a floating sleeve 66 adapted to make bearing contact on its inner surface with the end portion 56 and on its radially outer surface with the bore 24. To the right of the sleeve 66 is an O-ring seal 67 adapted to make sealing contact against both the end portion 56 and the bore 24. To the left of the sleeve 66 is a spring 69 which normally will make contact with both the left side of sleeve 66 and a radial shoulder 71 at the junction between the bores 23 and 24. It will be noted that spring 69 is a short helical spring of approximately two turns formed of a wire with a rectangular cross section to provide a minimum thickness in a radial direction and to allow positive bottoming or closing of the coils when the spring is compressed.

When there is no pressure supplied by the master cylinder 10 to the lines 11 and 12, the movable members in the warning switch unit 14 will tend to assume the position shown in FIG. 2. When the brakes are applied, the master cylinder generates equal fluid pressures in the supply lines 11 and 12, which results in equal pressures in bores 22 and 24. At this point, it should be understood that the portion including bore 23 intermediate the ends of the spool or piston 35 are at all times unpressurized and vented to the atmosphere either through the electrical switch unit 49 or a separate atmospheric vent. At this point, the spring 69 is uncompressed and holds the sleeve 66 in the position shown, while the O-ring 67 is likewise positioned adjacent the sleeve 66, although it may position itself along the end portion 56 and the washer 64 is provided to positively secure the O-ring against further outward movement from possible frictional forces. While the bore 24 is larger than bore 22, the diameter of the end portion 56 is less than that of bore 22, so that the area effectively opposed to fluid pressure is greater in bore 22 and the piston tends to move toward the right as seen in FIG. 2. This ensures that the piston 35 will continue such movement until the ramp 42 engages the switch plunger 52, which under relatively light forces serves as a stop. It will be understood that the plunger 52 is under the influence of a biasing spring urging it inwardly against the cylindrical surface 41 and it takes a considerable amount of force on the piston to force the plunger 52 upward to actuate the switch 49.

However, the same pressure is present in the bore 24 and acts on the O-ring 67 and sleeve 66 to force the sleeve 66 toward the left against the compressive force of spring 69. This will then cause the O-ring 67 to move with respect to its sealing surfaces on both the bore 24 and the end portion 56 and the sleeve will continue to move with respect to the spool 35 until the sleeve 66 engages the shoulder 55 between the end portion 56 and the right head portion 46. At this point, the spring 69 is only partially compressed and, since the area of bore 24 is greater than the area of bore 22, further buildup of pressure in both of these bores will then cause the spool 35 and sleeve 66 as a unit to move to the left until the spring 69 is completely collapsed or bottomed against the shoulder 71 and the coils are collapsed. This movement of the spool 35 toward the left then ensures positive movement between the other O-ring seal 38 and its bore 22 and the axial length of the reduced cylindrical portion 41 of spool 35 between the two ramps 42 and 44 is sufficient to allow this movement until the spring 69 is in the collapsed position before the switch plunger 52 can contact the right ramp 44. It will be understood that the biasing force of the spring 68 is such that it will be completely collapsed when the pressures in the master cylinder are on the order of 150-300 psi, which would correspond to a relatively normal brake application as encountered during normal driving.

When the brakes are released and the pressure in the lines 11 and 12 falls to zero, when the pressure is reduced below the level required to collapse the spring 69, that spring tends to force the sleeve 66 and O-ring 67 toward the right, and since the area of bore 22 is still greater than the bore of the end portion 56, the spool 35 will move in this direction until the switch plunger 52 is contacted by the left ramp 42, after which continued drop in pressure will allow the spring 69 to shift the sleeve 66 further toward the right away from the shoulder 55 and back to the position shown in FIG. 2.

It will therefore be seen that for each application of the brakes and for each subsequent release of braking pressure, the spool 35 will undergo an axial movement with respect to the housing 20 in such a manner that each of the O-ring seals 38 and 67 positively moves with respect to its sealing surfaces. That is, O-ring seal 38 moves with respect to bore 22 while O-ring seal 67 moves with respect to both bore 24 and end portion 56. This positive movement thus prevents setting of the seals and any damage which may occur as a result of long-term nonmoving contact between an O-ring seal and the adjacent sealing surface.

The foregoing mode of operation during each brake application does not affect the operation of the warning switch in the event of a leakage failure in one of the brake systems which prevents the buildup of pressure in that hydraulic circuit. For example, if when the brakes are applied there is a leakage in the rear brake circuit, while the front brakes are still operative, the pressure in supply line 11 will build up much greater than the pressure in supply line 12 so that there is no effective counterforce on either the sleeve 66 or the end portion 56 so that the pressure in bore 22 will cause the spool or piston 35 to move to the right and when the ramp 42 contacts the switch plunger 52, it then exerts sufficient force to cam the plunger 52 upward to actuate the switch 49 and thereby indicate a brake failure. Likewise, upon the failure of the front brakes, there is no effective pressure in the bore 22 so that the hydraulic forces in bore 24 will build up and even after the spring 69 is collapsed, the pressure acting on the effective area of the end portion 56 is sufficient to move the spool or piston 35 further to the left, with the shoulder 55 then moving leftward away from the sleeve 66. In this case, the ramp 44 then engages a switch plunger 52 and in like manner moves it upward to actuate the switch and indicate a brake failure in the usual manner.

It will also be understood that the cyclic movement of the spool 35 does not affect the operation of the proportioning valve 32 as explained in the aforementioned patent 3,832,007. This is because such proportioning valves generally only begin to operate at a pressure above that at which the spring 69 is fully collapsed and in such case the spool 35 will always be in a position with the right-hand ramp 44 adjacent the plunger 52 whenever the cut-in point of the proportioning valve is reached and the spool 35 will remain in this position as long as such higher pressures occur in the brake system.

While the embodiment above uses a single O-ring seal 67 in the right-hand side, it is recognized that this same sealing action could be provided by two separate O-ring seals mounted in grooves on the outer and inner peripheral surfaces of the sleeve 66 so that this member serves as both piston and seal without changing the function and mode of operation of the unit.

Although the preferred embodiment of this invention has been illustrated and described in detail, it is to be understood that various modifications and rearrangements of parts may be resorted to without departing from the scope of the invention as defined by the claims.

What is claimed is:

1. A differential pressure sensing device comprising a housing, a bore in said housing, a piston mounted in said bore for axially slidable movement therein, a first fluid pressure chamber at one end of said bore, a second fluid pressure chamber at the other end of said bore, passage means connecting said first and second fluid pressure chambers to separate sources of fluid pressure, said bore having a first diameter at said first fluid pressure chamber, said bore having a second diameter at said second fluid pressure chamber greater than said first diameter, said piston having a portion in said first fluid pressure chamber having said first diameter, said piston having a cylindrical portion in said second fluid pressure chamber having a diameter less than said first diameter, an annular seal means making sealing contact with said piston cylindrical portion and with said bore at said second diameter and being axially slidable with respect to said bore and said piston, an abutment on said piston engageable by said seal means on movement of said seal member away from said second fluid pressure chamber, a helical compression spring mounted around said piston and engageable at one end with said housing and at the other end with said seal means to bias said seal means toward said second fluid pressure chamber, and switch means operable by movement of said piston a predetermined distance in either axial direction.

2. A differential pressure sensing device comprising a housing, a bore in said housing, a piston mounted in said bore for axially slidable movement therein, a first fluid pressure chamber at one end of said bore, a second fluid pressure chamber at the other end of said bore, passage means connecting said first and second fluid pressure chambers to separate sources of fluid pressure, said bore having a first diameter at said first fluid pressure chamber, seal means on said piston to make sealing contact between said piston and said bore at said first diameter, said bore having a second diameter at said second fluid pressure chamber greater than said first diameter, said piston having a cylindrical portion in said second fluid pressure chamber having a diameter less than said first diameter, an annular seal member making sealing contact with said piston cylindrical portion and with said bore at said second diameter and being axially slidable with respect to said bore and said piston, an abutment on said piston engageable by said seal member on movement of said seal member away from said second fluid pressure chamber, a helical compression spring mounted around said piston and engageable at one end with said housing and at the other end with said seal member to bias said seal member away from said abutment and toward said second fluid pressure chamber, and switch means operable by movement of said piston a predetermined distance in either axial direction from a central position where said spring is not compressed and said seal member is spaced from said abutment.

3. A differential pressure sensing device as set forth in claim 2, wherein said seal member is an O-ring and an annular sleeve is interposed between said spring and said O-ring.

4. A differential pressure sensing device as set forth in claim 3, including stop means on said piston cylindrical portion to limit movement of said O-ring in the direction away from said annular sleeve.

5. A differential pressure sensing device as set forth in claim 3, wherein said piston has a reduced diameter portion intermediate said seal means and said abutment, said piston having conical cam ramps at each end of said reduced diameter portion, and said switch means includes a plunger movable by said cam ramps to produce a signal when said piston is shifted beyond said predetermined distance.

6. A differential pressure sensing device as set forth in claim 5, wherein the axial spacing between said cam ramps is greater than the difference between the uncompressed and fully compressed lenths of said spring.

7. A differential pressure sensing device as set forth in claim 2, wherein said spring is formed from a wire having a rectangular cross section.

* * * * *